US008630913B1

(12) United States Patent
Lawrence et al.

(10) Patent No.: US 8,630,913 B1
(45) Date of Patent: Jan. 14, 2014

(54) ONLINE REGISTRY SPLASH PAGE

(75) Inventors: Sarah Lawrence, Minneapolis, MN (US); Sarah Peterson, Minneapolis, MN (US); Gregory M. Nations, Minneapolis, MN (US); Chad R. Gourley, Elk River, MN (US); Patricia Korth-McDonnell, Brooklyn, NY (US); Joe Stewart, Brooklyn, NY (US)

(73) Assignee: Target Brands, Inc., Minneapolis, MN (US)

( * ) Notice: Subject to any disclaimer, the term of this patent is extended or adjusted under 35 U.S.C. 154(b) by 33 days.

(21) Appl. No.: 12/973,875

(22) Filed: Dec. 20, 2010

(51) Int. Cl.
*G06Q 30/00* (2012.01)

(52) U.S. Cl.
USPC ........................................................ 705/26.1

(58) Field of Classification Search
USPC ........................................................ 705/26.1
See application file for complete search history.

(56) References Cited

U.S. PATENT DOCUMENTS

| | | | |
|---|---|---|---|
| D109,791 S | 5/1938 | Sonin | |
| 5,423,139 A | 6/1995 | Feldman | |
| 5,644,735 A | 7/1997 | Luciw et al. | |
| 5,956,709 A | 9/1999 | Xue | |
| D415,483 S | 10/1999 | Decker | |
| 6,014,634 A | 1/2000 | Scroggie et al. | |
| 6,026,376 A | 2/2000 | Kenny | |
| 6,032,130 A | 2/2000 | Alloul et al. | |
| 6,055,573 A | 4/2000 | Gardenswartz et al. | |
| 6,141,666 A | 10/2000 | Tobin | |
| 6,182,871 B1 | 2/2001 | Lam | |
| 6,216,139 B1 | 4/2001 | Liston | |
| 6,298,330 B1 | 10/2001 | Gardenswartz et al. | |
| 6,542,927 B2 | 4/2003 | Rhoads | |
| 6,604,681 B1 | 8/2003 | Burke et al. | |
| 6,766,212 B1 | 7/2004 | Dean | |
| 6,965,376 B2 | 11/2005 | Tani et al. | |
| 7,002,573 B2 | 2/2006 | Trotta et al. | |
| 7,010,876 B1 | 3/2006 | Siegel et al. | |

(Continued)

FOREIGN PATENT DOCUMENTS

| | | |
|---|---|---|
| CA | 2714783 | 6/2011 |
| EP | 2015245 | 1/2009 |

(Continued)

OTHER PUBLICATIONS

Huge, Target Patents, Target Patent Annotations, PowerPoint Slides, Mar. 28, 2011, 35 pages.

(Continued)

*Primary Examiner* — Mila Airapetian
(74) *Attorney, Agent, or Firm* — Merek, Blackmon & Voorhees, LLC

(57) ABSTRACT

In one embodiment, a web page presented to a user includes a header section that substantially spans the top of the web page and provides a menu of selectable options as well as a search input box. A main section beneath the header section provides a registry creation control, selectable to activate a gift registry creation process, and a registry search box, providing a user with a means for searching for a particular gift registry. Beneath the main section, two promotional regions are positioned side-by-side. One of the promotional regions includes two or more sub-regions, each sub-region presenting information regarding a respective promotional concept. The other promotional region presents information regarding a main promotional concept. In some embodiments, the sub-regions are vertically aligned in a column.

19 Claims, 4 Drawing Sheets

FIG. 1

(56) References Cited

U.S. PATENT DOCUMENTS

| | | | |
|---|---|---|---|
| 7,055,130 B2 | 5/2006 | Charisius et al. | |
| 7,062,453 B1 | 6/2006 | Clarke | |
| 7,263,499 B2 | 8/2007 | Kunigita | |
| 7,284,206 B2 | 10/2007 | Ozawa et al. | |
| 7,409,362 B2 | 8/2008 | Calabria | |
| 7,503,502 B2 | 3/2009 | Montague | |
| D590,412 S | 4/2009 | Saft et al. | |
| 7,529,797 B2 | 5/2009 | Tseng et al. | |
| D599,373 S | 9/2009 | Kobayashi et al. | |
| 7,603,292 B1 | 10/2009 | Bragg et al. | |
| 7,613,687 B2 | 11/2009 | Nye | |
| 7,676,387 B2 | 3/2010 | Childress et al. | |
| 7,702,542 B2 * | 4/2010 | Aslanian, Jr. | 705/14.73 |
| D619,613 S | 7/2010 | Dunn | |
| D622,280 S | 8/2010 | Tarara | |
| D625,323 S | 10/2010 | Matsushima et al. | |
| D626,133 S | 10/2010 | Murphy et al. | |
| 7,890,378 B2 | 2/2011 | Clarke et al. | |
| 7,996,282 B1 | 8/2011 | Scott et al. | |
| 8,001,003 B1 | 8/2011 | Robinson et al. | |
| D644,663 S | 9/2011 | Gardner et al. | |
| D656,950 S | 4/2012 | Shallcross et al. | |
| 8,244,590 B2 | 8/2012 | Rothman | |
| 8,250,145 B2 | 8/2012 | Zuckerberg et al. | |
| 2001/0029465 A1 | 10/2001 | Strisower | |
| 2002/0046105 A1 | 4/2002 | Gardenswartz et al. | |
| 2002/0165799 A1 | 11/2002 | Jaffe et al. | |
| 2003/0014501 A1 | 1/2003 | Golding et al. | |
| 2003/0050848 A1 | 3/2003 | Defayette et al. | |
| 2005/0055321 A1 | 3/2005 | Fratkina et al. | |
| 2005/0081251 A1 | 4/2005 | Walker et al. | |
| 2005/0144093 A1 | 6/2005 | Kassan | |
| 2005/0147054 A1 | 7/2005 | Loo et al. | |
| 2005/0149269 A1 | 7/2005 | Thomas et al. | |
| 2006/0053066 A1 | 3/2006 | Sherr et al. | |
| 2006/0103130 A1 | 5/2006 | Koivukunnas et al. | |
| 2006/0277103 A1 | 12/2006 | Fujita et al. | |
| 2006/0277477 A1 | 12/2006 | Christenson | |
| 2007/0022020 A1 | 1/2007 | Bernstein | |
| 2007/0078850 A1 | 4/2007 | Aziz et al. | |
| 2007/0095615 A1 | 5/2007 | Spector | |
| 2007/0162850 A1 | 7/2007 | Alder et al. | |
| 2007/0192168 A1 | 8/2007 | Van Luchene | |
| 2007/0226189 A1 | 9/2007 | Piekos et al. | |
| 2007/0244883 A1 | 10/2007 | Bessieres et al. | |
| 2007/0244900 A1 | 10/2007 | Hopkins et al. | |
| 2007/0300261 A1 | 12/2007 | Barton et al. | |
| 2008/0005125 A1 | 1/2008 | Gaedeke | |
| 2008/0077487 A1 | 3/2008 | Davis et al. | |
| 2008/0097844 A1 | 4/2008 | Hsu et al. | |
| 2008/0147640 A1 | 6/2008 | Schachter | |
| 2008/0235085 A1 | 9/2008 | Kovinsky et al. | |
| 2008/0255962 A1 | 10/2008 | Chang et al. | |
| 2008/0270248 A1 | 10/2008 | Brill | |
| 2008/0270250 A1 | 10/2008 | Bolivar et al. | |
| 2009/0037355 A1 | 2/2009 | Brave et al. | |
| 2009/0106085 A1 | 4/2009 | Raimbeault | |
| 2009/0106113 A1 | 4/2009 | Arora et al. | |
| 2009/0132388 A1 | 5/2009 | Omori et al. | |
| 2009/0164315 A1 | 6/2009 | Rothman | |
| 2009/0164323 A1 | 6/2009 | Byrne | |
| 2009/0171812 A1 | 7/2009 | Fadell | |
| 2009/0173792 A1 | 7/2009 | Montague | |
| 2009/0199115 A1 | 8/2009 | Singh | |
| 2009/0265968 A1 | 10/2009 | McNamee | |
| 2009/0273612 A1 | 11/2009 | Xie | |
| 2009/0292599 A1 | 11/2009 | Rampell et al. | |
| 2009/0299965 A1 | 12/2009 | Aziz et al. | |
| 2009/0307100 A1 | 12/2009 | Nguyen et al. | |
| 2010/0114720 A1 | 5/2010 | Jones et al. | |
| 2010/0179876 A1 | 7/2010 | Holte | |
| 2010/0186066 A1 | 7/2010 | Pollard | |
| 2010/0223082 A1 | 9/2010 | Becker et al. | |
| 2011/0029368 A1 | 2/2011 | Hsu et al. | |
| 2011/0125569 A1 | 5/2011 | Yoshimura et al. | |
| 2011/0153451 A1 | 6/2011 | Bitz et al. | |
| 2011/0173095 A1 | 7/2011 | Kassaei et al. | |
| 2011/0225152 A1 | 9/2011 | Beaudreau et al. | |
| 2011/0251925 A1 * | 10/2011 | Savilia et al. | 705/27.1 |
| 2011/0302498 A1 | 12/2011 | Gorodyansky | |
| 2012/0166945 A1 | 6/2012 | Roberts et al. | |

FOREIGN PATENT DOCUMENTS

| | | |
|---|---|---|
| WO | WO 00/79446 | 12/2000 |
| WO | WO 01/45020 | 6/2001 |
| WO | WO 01/84447 | 11/2001 |
| WO | WO 02/03268 | 1/2002 |
| WO | WO 2005/066844 | 7/2005 |
| WO | WO 2006/101348 | 9/2006 |
| WO | WO 2007/005431 | 1/2007 |

OTHER PUBLICATIONS

Maldonado, Robert T., Letter to Gardella, Greg H., Re: Inventor Declarations from HUGE Inventors, Mar. 31, 2011, 2 pages.

Gardella, Greg H., Letter to Robert T. Maldonado, Re: HUGE Inventors for Target Brands, Inc. Patent Applications, Apr. 11, 2011, 5 pages.

BabiesRus, Baby Gifts—Baby Registry at BabiesRus, [Online], Dec. 20, 2010, Retrieved from the Internet at: http://www.toysrus.com/registry/index.jsp, 1 page.

Crate&Barrel, [Online], Dec. 20, 2010, Retrieved from the Internet at: http://www.crateandbarrel.com/gift-registry/, 1 page.

Amazon.com, [Online], Dec. 20, 2010, Retrieved from the Internet at: http://www.amazon.com/gp/wedding/homepage/ref=sv_cm_gft_5, 1 page.

Macy's, [Online], Dec. 20, 2010, Retrieved from the Internet at:http://www.macys.com/registry/wedding/registryhome, 1 page.

Amazon, Prime Eligible Under $25, [Online], Dec. 19, 2009, Retrieved from the Internet at: http :I/www.amazon.com/s/Znode=2238906011 &field%2dprice=%2d2500&p%5f76=1, 4 pages.

Amazon, Recommended for You, [Online], Dec. 21, 2009, Retrieved from the Internet at https:I/www.amazon.com/gp/yourstore?ie=UTF8&ref_=pd%5Firi%5Fgw, 3 pages.

Amazon, search Results for Columbia 100% cotton Towels, Retneved Aug. 10, 2011 from the Internet at: http://www.amazon.com/gp/search/ref=sr_nr_scat_1 0789941_1n?rh=n%3A10789941 %2Ck%3Acotton+bath+towels &keywords=cotton+bath+towels&ie=UTF8&qid=1312572186 &scn=1 0789941&h=5ec5aedf63cc88f6e48fda6b27c85681 ae 7a21 ba, 6 pages.

Amazon.com Universal Wish List, [Online]. Dec. 20, 2010, Retrieved from the Internet at: http://www.amazon.com/b/?ie=UTF8 &node=2223317011 &tag=googhydr-20&hvadid=3877744091 &ref=pd_sl_37ck7ovrfc_b, 3 pages.

Bedding & Bath, http://fvvww.kohls.com/kohlsStore/bedandbath/towels/decorativetowels.jsp?bmForm=guided_nav-search &SubcatFolderiD=2534374752660882, at least as early as Mar. 29, 2011 (2 pages).

Best Buy, Every Day Laptops, [Online], Dec. 13, 2009, Retrieved from the Internet at: http://www.bestbuy.com/site/Laptop-Computers/Everyday-Laptops, 4 pages.

BestBuy, Search Results for iT, Retrieved Aug. 5, 2011 from the Internet at: http:f/www.bestbuy.com/site/olspage.jsp;jsessionid=9B6687FFBB3C82, 8 pages.

Canon Digital Rebel XT Review (www.dcviews.com, Jul. 4, 2007, 5 pages.

Office Action from Canadian Patent Application No. 2.761,936, mailed Jul. 16, 2012 (3 pages).

Office Action from Canadian Patent Application No. 2.761,936, mailed Nov. 21, 2012 (3 pages).

Office Action from Canadian Patent Application No. 2.761,936, mailed Apr. 18, 2013 (3 pages).

Office Action from Canadian Patent Application No. 2.761,560, mailed Apr. 18, 2013 (3 pages).

Office Action from Canadian Patent Application No. 2,781,784, mailed Nov. 27, 2012 (4 pages).

(56) References Cited

OTHER PUBLICATIONS

Eddie Bauer.com [Online] Dec. 20, 2010, Retrieved from the Internet at: https://www.eddiebauer.com/checkout/bag.jsp?&categoryId=95 &categoryName=SWEATERS--CARDIGANS&pCategoryId=3 &pCategoryName=WOMEN&gpCategoryId=1 &gpCategoryName=EB#ppl=% 7Btype%3A%22transition%22%2CensembleId%3A%2236211% 22%2CformatStr%3A%22product%22%2CpassedId0bj%3A%7B %22ensembleId%22%3A%2236211%22%7D%2CcategoryId% 3A%2227411%22%2CpathInfo%3A%22undefined.
Etihad Airways Home Page, Retrieved Aug. 10, 3011 from the Internet at: http://www.etihadairways.com/sites/etihad/us/en/home/pages/home.aspx?cid=ppc_start, 1 page.
Facebook Adds Profile Preview Feature [Online], Jan. 7, 2010, Retrieved from the Internet at: http://www.allfacebook.com/facebook-adds-profile-preview-feature-2008-09, 5 pages.
Facebook Developers Facebook Connect, Build and grow with Facebook Connect, [Online] Dec. 18, 2009, Retrieved from the Internet at: http://developers.facebook.com/connecl.php, 2 pages.
Google Product search results for "Canon Powershot", Retrieved Mar. 5, 2010 from the Internet at: http://www.google.com/products?q=canon+powershot&aq=O&oq=canon+p, 3 pages.
Grannell, Craig, .net/techniques, /CSS/create a navigation bar, Sep. 2, 2007, 4 pages.
HP Support, Search Results for "HP Pavilion dv7t-1 000" I FAQ, Retrieved Mar. 25, 2010 from the Internet at: http://h10061.www1.hp.com/ccsearch/search?pname=H P+Pavilion+dv7t-1000+CTO+Ent, 1 page.
Han, Taedong, Exploring Price and Product Information Search Behavior in e-Market, Proceedings of the International Conference on Information Technology: Coding and Computer, Mar. 2005, 6 pages.
Just-Style: connecting to consumers, [Online], Sep. 16, 2002, Retrieved from the Internet at: http://www.just-style.com/articleprinl.aspx?id=93012 on Dec. 19, 2009,4 pages.
Kitchen & Dining, http://fvvww.amazon.com/kitchen-dining-small-appliances-cookware/b?ie=UTF8&node=284507, at D/S.L./ least as early as Jan. 28, 2011 (3 pages).
Kohls [Online], Dec. 20, 2010, Retrieved from the Internet at: http://www.kohls.com/upgrade/webstore/home.jsp;jsessionid=3cSgNPp TqV8tRh32vBzDf2q 12xQJzpWQjD5Mpnrqlp3wtMX81Psn!-17 48685949! 105707934, 2 pages.
Kohls, Search Results for "bath towel", Retrieved Aug. 5, 2011 from the Internet at: http://www.kohls.com/upgrade/webstoreIhome.jsp;jsessionid=2W1QTB, 3 pages.
Lin, Wen-Shan et al., Understanding Consumer Search Activity and Online Purchase Intensions for Improving the Product Recommendation Search, 6th IEEE/ACIS International Conference on Computer and Information Science, D, Apr. 2007, 6 pages.
Logictech Mouse Home Page, Retrieved Aug. 10, 2011 from the Internet at: http://www.logitech.com/en-us/mice-pointers/mice, 13 pages.
Muspy, Artists [Online], Jan. 7, 2010, Retrieved from the Internet at: http://www.muspy.com/artists, 2 pages.
Online Pharmacy for Prescription Drugs—CVS Pharmacy Drug Store [Online], Dec. 21, 2009, Retrieved from the Internet at: http://www.cvs.com/CVSApp/user/home/homejsp, 2 pages.
Organize.com, Kitchen, [Online], Dec. 20, 2009, Retrieved from the Internet at: http://www.organize.com/kitchen.html, 4 pages.
OfficeMax, Laptop Notebook Computers: New Laptop Computers, Wireless Laptop Computers, [Online], Dec. 13, 2009, Retrieved from the Internet at: http://www.officemax.com/technology/computers/laptop-computers, 3 pages.
Pet, CSN Stores, [Online], Dec. 20, 2009, Retrieved from the Internet at http://www.csnstores.com/Pet-C216358.html, 2 pages.
"Priceless Promotions," by Samantha Murphy, Chain Store Age 84. 10 (Oct. 2008): 58.
"Processors-Desktops," http ://fvvww. neweg g. com/Store/ SubCategory .aspx? SubCategory=34 3&nam e= Processors- Desktops, at least as early as Dec. 30, 2010 (1 page).
Sam's Club, [Online], Dec. 21, 2009, Retrieved from the Internet at: http://www.samsclub.com/shopping/index.jsp, 3 pages.
Sony Notebook Home Page, Retrieved Aug. 10, 2011 from the Internet at: http://store.sony.com/webapp/wcs/stores/servlet!CategoryDisplay?catalogId= 1 0551 &storeId= 1 0151 &langId=-1 &categoryId= 16154&SR=nav:electronics: computers:laptops:shop_compare:ss&ref=http%3A%2F%2Fwww.sony.com%2Findex.php, 5 pages.
Sonystyle, [Online], Dec. 13, 2009, Retrieved from the Internet at: http://www.sonystyle.com/webapp/wcs/stores/servlet/ StoreCatalogDisplay?langId=- 1&storeId=10151 &catalogId=10551&eid=372683003, 2 pages.
Tom's Hardware Home Page, Tom's Hardware: Hardware News, Tests and Reviews, Retrieved Mar. 4, 2010 from the Internet at:: http://www.tomshardware.com/u/#redirect, 3 pages.
Walmart, [Online], Dec. 21, 2009, Retrieved from the Internet at: http://www.walmart.com, 2 pages.
Yahoo! Small Business, Effective Navigation Bar Design, [Online], Dec. 21, 2009, Retrieved from the Internet at: http://sma llbusiness. yahoo .com/r- pfp-a- 40931-m-6-sc-37 -effective_navigation_b ar_design .html, 1 page.
Jan. 28, 2013 Office Action, U.S. Appl. No. 12/973,651.
Mar. 18, 2013 Office Action, U.S. Appl. No. 12/887,098.
http://www.target.com, Target Brands, Inc., Archived on Jul. 14, 2009, retrieved from web.archive.org/web/20090714060557/http://www.target.com, p. 1-84.
Kalbach, Designing Web Navigation, O'Reily Media, Aug. 2007, pp. 73-74; p. 90.
Meloni, Sams Teach Yourself HTML and CSS in 24 Hours, 8th ed., Sams Publishing, Dec. 2009, p. 361.
Van Duyne et al., The Design of Sites: Patterns for Creating Winning Web Sites, 2nd ed., Prentice Hall, 14, Dec. 2006, p. 677-758.
Cohen, The Unusually Useful Web Book, New Riders Publishing, Jun. 2003, p. 113-114.
TGT—Target Financial Community Meeting, Jan. 21, 2010.
Office Action from Canadian Patent Application No. 145,725 mailed Oct. 1, 2012 (1 page).
Steve Eastman Presentation, Target Managers Meeting, Mar. 15, 2010.
Poem entitled "i carry your heart with me (i carry it in," by E.E. Cummings [On-line], Poem dated 1920. Retrieved from Internet 06-03-2-13. URL:>http://en.wikipedia.org/wiki/E._E._Cummings<. . (12 pages, see p. 5).

* cited by examiner

ONLINE REGISTRY SPLASH PAGE

A user interacts with a web browser in order to view web pages on the Internet while searching for information. A collection of related web pages, for example, created by a single person, company, or entity is referred to as a web site.

Some web sites allow a user to create a user account. To create an account the user is asked to create a username and password and complete an account profile. A completed account profile includes information such as the user's name, home address, and username for social networking sites. When signed on through a combination of username and password, for example, the user accesses information including their past purchases, shopping lists, and the shipping status of their past purchases.

Some web pages are customized based on the user's account profile. Customized web pages display user specific information including a user specific welcome message, local store information, product reviews from members of the user's social network, and suggested products based on the user's past purchases.

A user creates a gift registry to share purchase interests with others. For example, a user creates a wedding gift registry to allow wedding guests to shop for desired items. Other common registries include baby shower registries, birthday gift registries, and bar or bat mitzvah registries.

SUMMARY

In one embodiment, a web page presented to a user includes a header section that substantially spans the top of the web page and provides a menu of selectable options as well as a search input box. A main section beneath the header section provides a registry creation control, selectable to activate a gift registry creation process, and a registry search box, providing a user with a means for searching for a particular gift registry. Beneath the main section, two promotional regions are positioned side-by-side. One of the promotional regions includes two or more sub-regions, each sub-region presenting information regarding a respective promotional concept. The other promotional region presents information regarding a main promotional concept. In some embodiments, the sub-regions are vertically aligned in a column.

In another embodiment, a web page presented to a user includes a shopping cart indicator and a product description including a product image and a product price. Selection of a purchase control associated with the product description causes the addition of the associated product to the shopping cart feature. Selection of the purchase control or the shopping cart indicator causes the generation of a pop-up window including a checkout region and a shopping cart summary region. A checkout control is displayed in the checkout region. Product descriptions related to each product selected for purchase are arranged in the shopping cart summary region.

In a further embodiment, a web page presented to a user includes a header section that substantially spans the top of the web page and provides a menu of selectable options as well as a search input box. A main section beneath the header section provides share registry control. Beneath the main section, a third region displays information regarding a gift registry. The third region includes one or more product category regions, each product category region including one or more product sub-categories. Each product sub-category includes a respective circle icon, the circle icons optionally including a first numeral indicating a number of items within the respective product sub-category. Each product sub-category is selectable to cause the presentation of one or more items categorized within the respective product sub-category which are available to purchase through a retailer associated with the web page. The share registry control is selectable to cause the presentation of a user interface configured to accept information related to one or more additional users and to cause the sharing of gift registry information with the one or more additional users.

The details of one or more embodiments are set forth in the accompanying drawings and the description below. Other features and advantages will be apparent from the description and drawings, and from the claims.

DESCRIPTION OF DRAWINGS

This document describes these and other aspects in detail with reference to the following drawings.

DETAILED DESCRIPTION OF ILLUSTRATIVE EMBODIMENTS

Figure 1A:
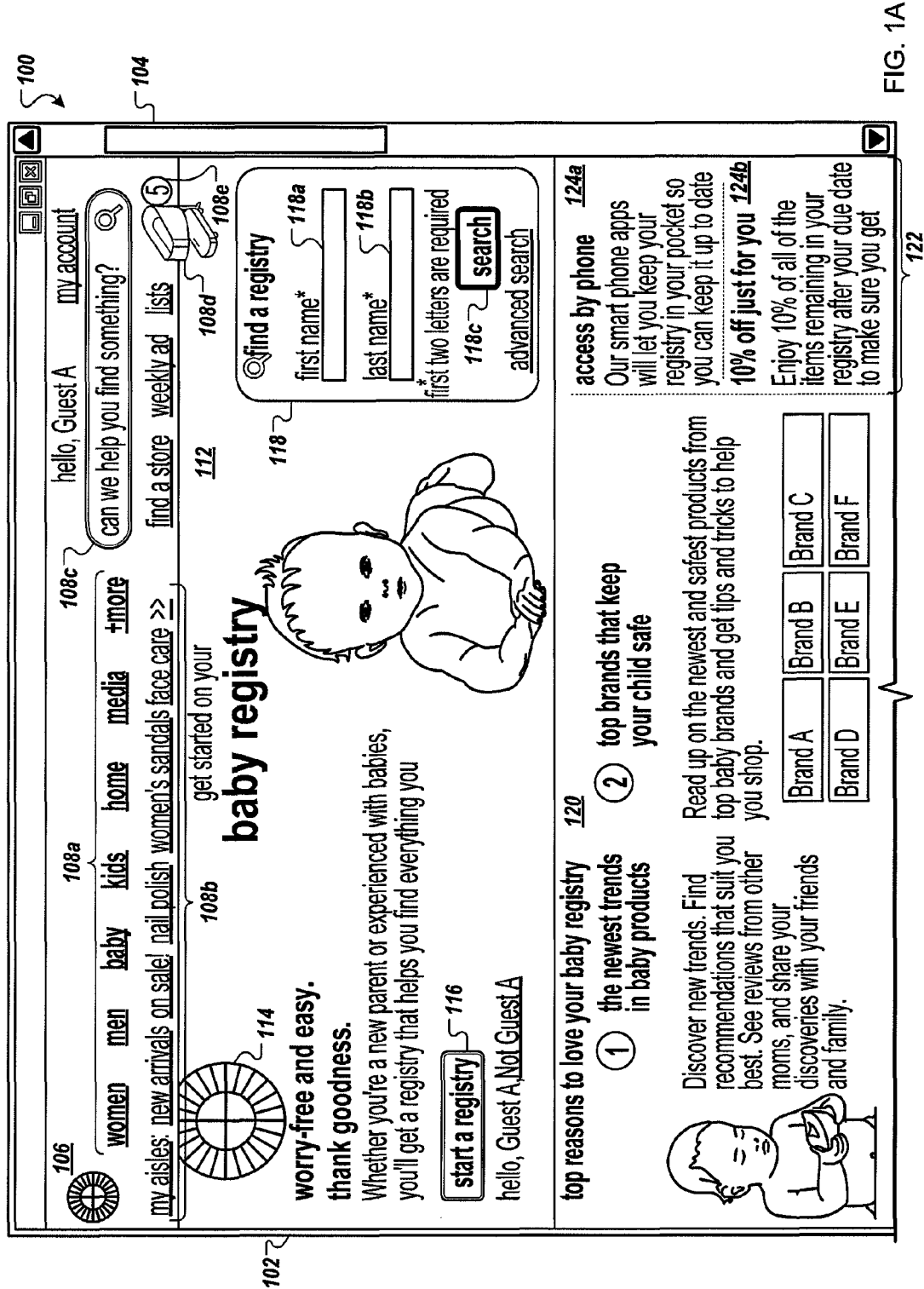
FIGS. 1A and 1B show two views of an example retail web page.
Figure 1B:
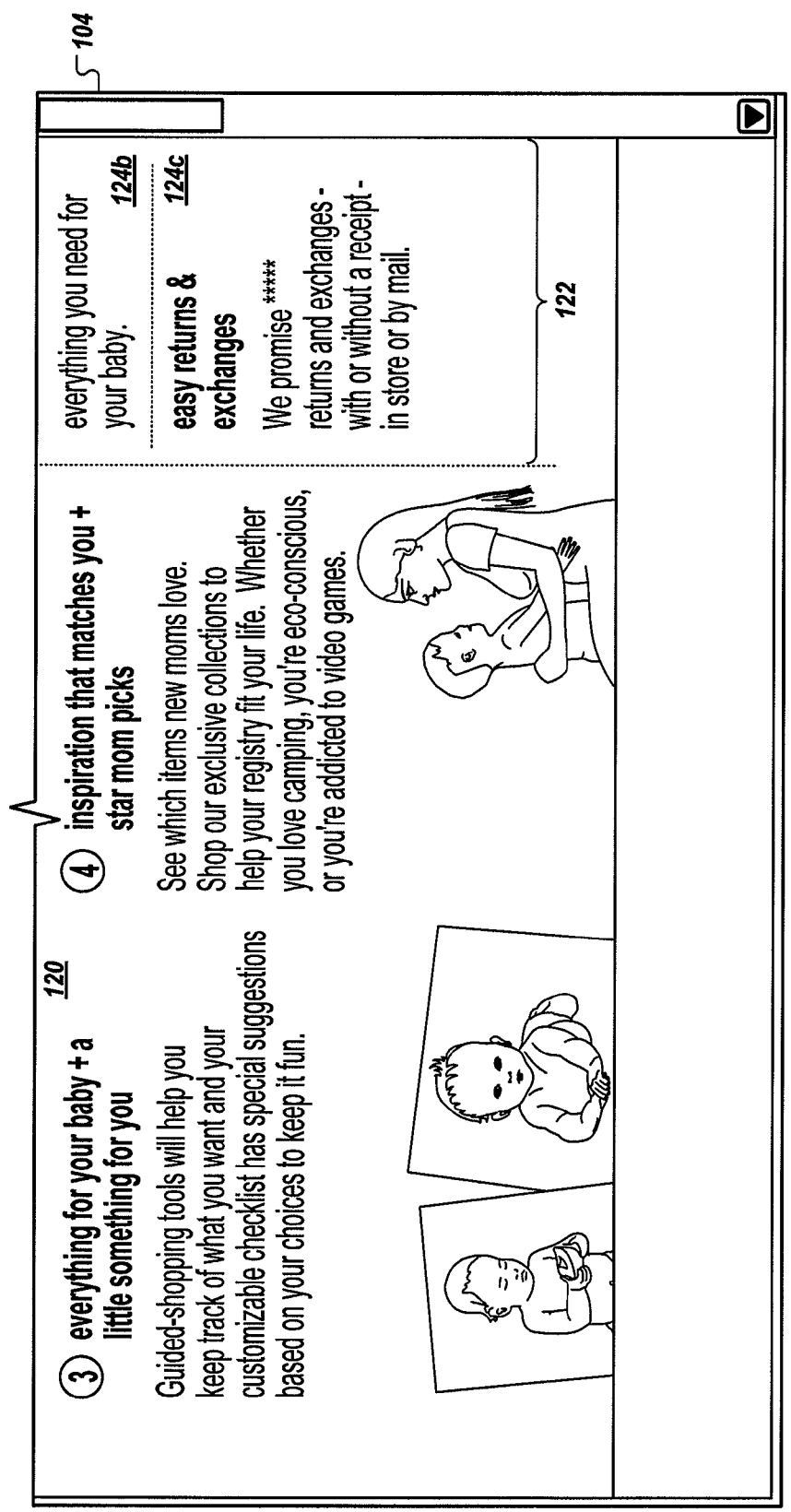

Referring to FIG. 1A, an example web page 100 is displayed in a window 102 of a screen (e.g., a computer monitor, a smart phone display, a television). In general, the web page 100 is laid out to be substantially the width of the window 102 and extends vertically. In some implementations, the web page 100 includes more information than is conveniently displayed on the window 102 at one time. For example, a user interacts with a scroll bar 104 to shift the view of the web page 100 vertically. As seen in FIGS. 1A-1B, the scroll bar 104 is illustrated in two different positions, corresponding to two different vertically located views of the web page 100.

The web page 100 includes a page header 106 substantially spanning the width of the web page 100. The page header 106 includes a collection of menu items 108a and a collection of menu items 108b. In some implementations, the user selects the menu items 108a-108b to link to other web pages or to activate the display of submenu items.

A search input box 108c is provided for users to enter search strings. For example, the user could type in keywords associated with a product he or she is seeking (e.g., "blue jeans", "frozen pizza", "batteries") to activate a search routine that helps the user find what he or she is shopping for.

A shopping cart indicator 108d is selected by the user to display a list of items the user has already selected to purchase. A quantity indicator 108e is superimposed on the shopping cart indicator 108d. The quantity indicator 108e displays the quantity of items that the user has already selected for purchase (e.g., how many items are in the user's virtual shopping cart or bag). In some implementations, the quantity indicator 108e is displayed only when the user has selected one or more items for purchase (e.g., displayed only when the virtual shopping bag has something in it).

Below the page header 106 is a registry region 112. The registry region 112 provides information about one or more gift registry services available through the retailer. The registry region 112 includes a retailer logo 114, a "start a registry" control 116, and a "find a registry" search box 118. The "start a registry" control 116, when activated, causes the presentation of an interactive online service, such as a separate web page, including controls providing options for a user to generate a new gift registry. The "find a registry" search box 118 includes a first name field 118a, a last name field 118b, and a search control 118c. A user, for example, populates at least one of the first name field and the last name field, then activates the search control 118c to issue a query to a registry database, locating a registry created by an individual described by the information submitted in the name fields 118a and 118b.

Beneath the registry region 112, a main promotional region 120 is aligned to the left of a column region 122 of promotional sub-regions 124a, 124b, and 124c (as shown in FIG. 1B). The main promotional region 120, in some implementations, is substantially greater in width than the promotional sub-regions 124a, 124b, and 124c. The main promotional region 120, for example, contains information pertaining to the advantages of creating a gift registry with the retailer, while each of the promotional sub-regions 124a, 124b, and 124c list other information pertaining to gift registries. For example, a first promotional sub-region 124a provides information regarding accessing a gift registry using a mobile device such as a smart phone. A second promotional sub-region 124b offers a discount available after an event (e.g., baby due date, wedding, birthday, etc.) has passed. As shown in FIG. 1B, a third promotional sub-region 124c describes the merchandise return and exchange policy for the retailer. In other implementations, the promotional sub-regions 124a, 124b, and 124c include featured products, sponsored products, or other promotional information regarding the retailer.

In various implementations, rich content is positioned "below the fold," or below the bottom of the screen as the webpage is initially displayed to a user. FIG. 1B depicts content that is displayed below the fold, or below the bottom edge of the display of FIG. 1A. The content displayed below the fold, in some implementations, is selected so as to draw consumers' attention below the fold. For instance, the partial information displayed in the main promotional region 120 or the second promotional sub-region 124b in FIG. 1 may encourage a consumer to scroll down, below the fold, if the consumer is interested in reading the additional information. Such an approach, in certain embodiments, has the effect of rendering the middle and bottom portions of the page more usable or valuable including in the sense that those regions will more likely be viewed by consumers.

The "fold" on a page will often be a function of the aspect ratio of the monitor on which the web page is displayed. The depicted displays have an aspect ratio of about 1:1. Monitors typically have an aspect ratio of about 1:1 or less, sometimes about 3:2 for wide-screen monitors.

Figure 2:
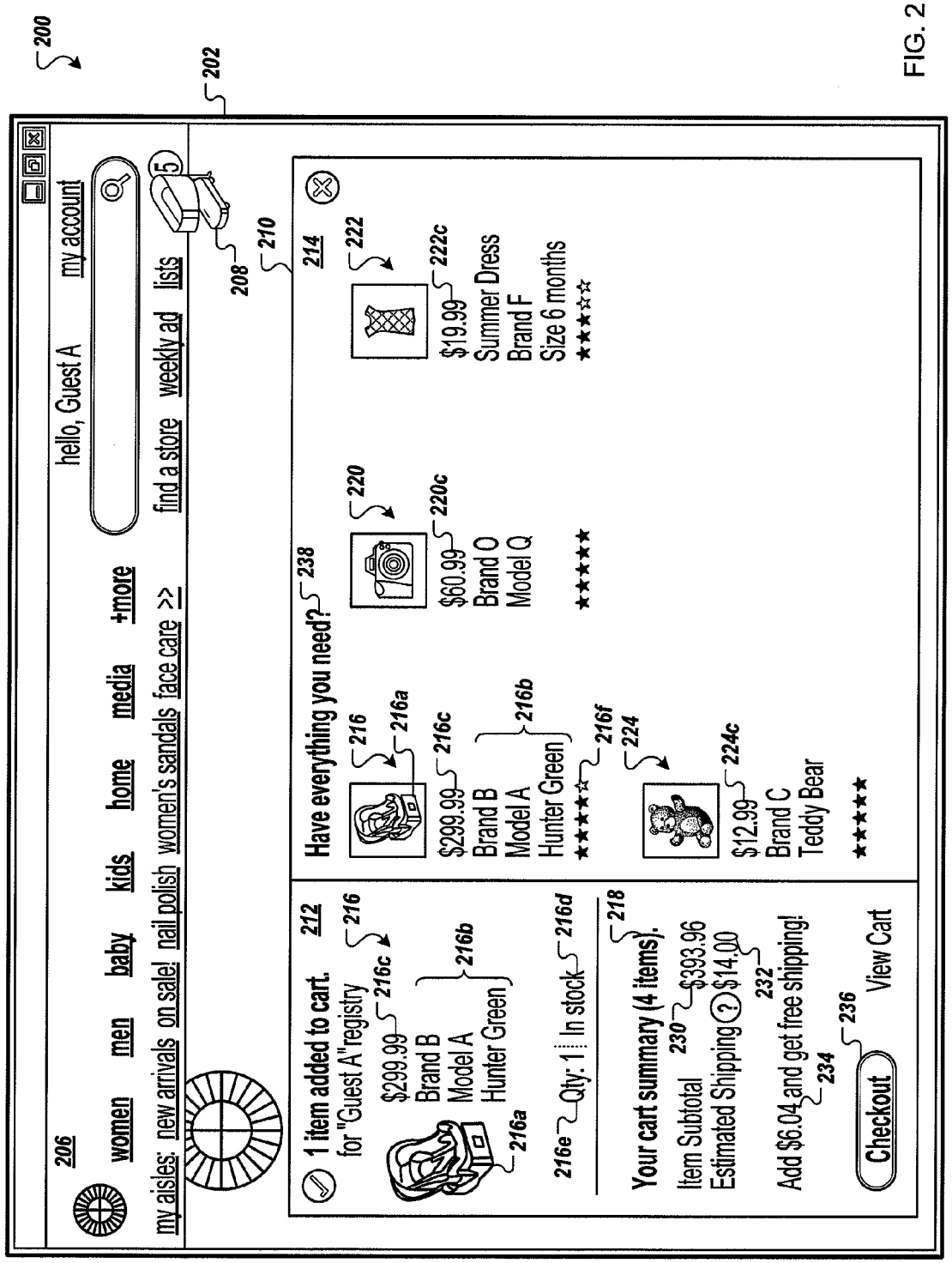
FIG. 2 shows another view of an example retail web page.

Referring now to FIG. 2, a web page 200 is displayed in a window 202. The web page 200 includes a page header 206 that is substantially similar to the page header 106 of FIG. 1A.

A shopping cart pop-up window 210 is superimposed upon the web page 200. In some examples, the shopping cart pop-up window 210 is generated when a user selects an item from a gift registry to purchase (e.g., through the selection of a purchase control), or when a user selects (or, optionally, hovers over) a shopping cart indicator 208. The shopping cart pop-up window 210 includes a checkout region 212 and a cart summary region 214.

The top of the checkout region 212 illustrates a most recently added product description 216 including a most recently added product image 216a, a most recently added product description 216b, a most recently added product price 216c, a most recently added product availability indicator 216d, and a selected quantity indicator 216e.

Beneath the product description, a cart summary indicator 218 indicates that a total of four items have been added to the shopping cart. Each of these four items, for example, is displayed within the cart summary region 214. For example, the most recently added product image 216a, a portion of the most recently added product description 216b, and the most recently added product price 216c, along with a most recently added product rating 216f are displayed in the cart summary region 214, along with product descriptions 220, 222, and 224.

Returning to the cart summary region 214, the totals of all of the product prices 216c, 220c, 222c, and 224c are listed as an item subtotal 230. To this total, an estimated shipping cost indicator 232 is optionally added. For example, a user avoids the shipping charges by adding one or more additional products to the shopping cart with a purchase price meeting or exceeding a free shipping purchase total variance as noted in a purchase total variance indicator 234. The cart summary region 214 includes a message 238 encouraging the user to consider purchasing additional items. If the user is ready to check out, the user selects a checkout control 236 which, when activated, causes the generation of a checkout routine. For example, a checkout routine includes a web page or series of web pages with interactive controls used to indicate payment and shipping information. In another example, the checkout routine accesses stored information (e.g., associated with a user profile registered with the retailer) to automatically process a purchase order.

In various implementations, the width ratio of the checkout region 212 to the cart summary region 214 of the pop-up window 210 is substantially less than 50:50. In the example of FIG. 2, the width ratio is about 40:60. In other embodiments, the width ratio is about 30:70 to about 45:55.

Figure 3:
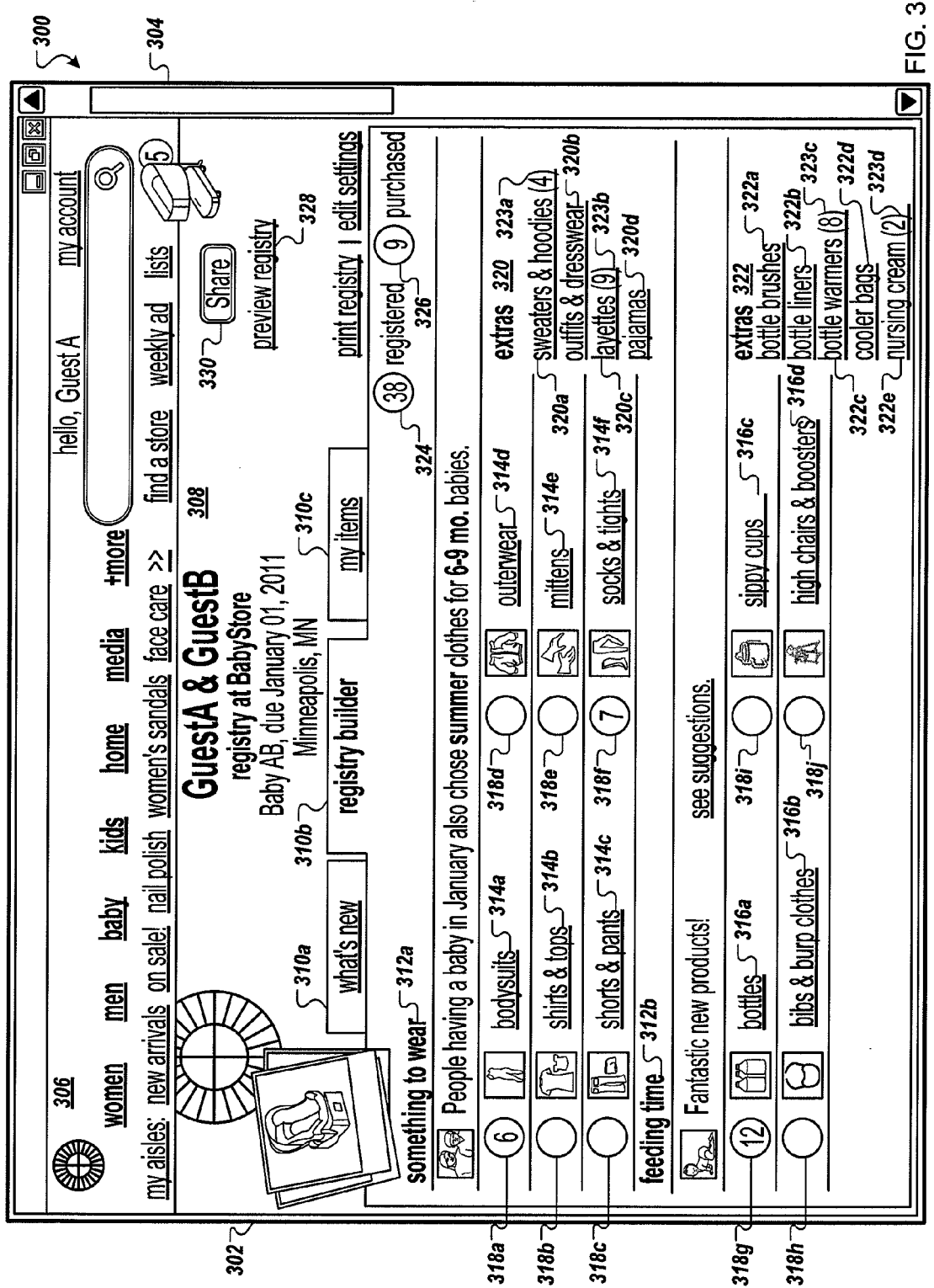
FIG. 3 shows a further view of an example retail web page.

Referring to FIG. 3, an example web page 300 is displayed in a window 302 of a screen (e.g., a computer monitor, a smart phone display, a television). In general, the web page 300 is laid out to be substantially the width of the window 302 and extends vertically. In some implementations, the web page 300 includes more information than is conveniently displayed on the window 302 at one time. For example, a user interacts with a scroll bar 304 to shift the view of the web page 300 vertically.

The web page 300 includes a page header 306 that is substantially similar to the page header 106 of FIG. 1A. Beneath the page header 306, a guest registry region 308 includes information regarding a gift registry personalized by GuestA. For example, the user GuestA selects the "start a registry" control 116 as shown in FIG. 1A to create a personalized gift registry. Selection of the "start a registry" control 116, for example, causes the generation of the web page 300. Beneath the guest registry region, a series of registry building tabs 310 are available to the user including a "what's new" tab 310a, a "registry builder" tab 310b, and a "my items" tab 310c.

The registry builder tab 310b is currently active. The user selects the "registry builder" tab 310b, for example, to access recommendations for adding to a gift registry. For example, the baby gift registry building information displayed by web page 300 includes product categories 312 (e.g., "something to wear" 312a and "feeding time" 312b) as well as individual product sub-categories 314, 316 within each product category 312. The "registry builder" tab 310b, in some embodiments, includes any number of product categories 312 with any number of optional product sub-categories. The user, for example, uses the scroll bar 304 to access additional product categories 312 and, optionally product sub-categories listed in the "registry builder" tab 310b. The user selects a particular product sub-category 314 or 316, for example, to register for items within the selected product sub-category 314 or 316. For example, selection of a socks & tights product sub-category 314f causes the generation of a web page including one or more products, categorized as baby socks or baby tights, available for purchase through the web site.

In some implementations, one or more of the product sub-categories 314, 316 are broken down into further detail. In one example, the recommended product sub-category outerwear 314d is further broken down into jackets, snow suits, and buntings.

Each product sub-category 314, 316 is associated with a circle icon 318. The circle icon 318, in some embodiments, alerts the user to the number of items currently registered within each of the sub-categories 314, 316. For example, a sub-category bodysuits 314a is associated with a circle icon 318a including the numeral "6" indicating that the user has registered for six items within the sub-category bodysuits 314a. If no numeral is included in a particular circle icon 318, such as the circle icon 318b associated with the sub-category shirts & tops 314b, this, for example, indicates that the user has not yet registered for any items within the sub-category shirts & tops 314b. In some embodiments, the circle icon 318 serves as a suggestion to the user of a recommended number of items to register for in each of the sub-categories 314, 316. For example, the sub-category bottles 316a is associated with a circle icon 318g including the numeral "12", suggesting to the user that registering for a dozen bottles would be appropriate for the typical baby gift registry. If the user registers for one or more bottles, in some implementations, the numeral in the circle icon 318g associated with the product sub-category bottles 316a is decremented to provide an updated recommendation for additional number of products to be registered in the product sub-category bottles 316a.

Associated with each of the product categories 312a and 312b, to the right of the respective product sub-categories 314 and 316, a first extras region 320 and a second extras region 322 list more product sub-categories. The extras regions 320 and 322, in some implementations, present product categories considered optional to the registry. For example, the product sub-categories 314 and 316 include items considered as essential baby products, while the extras regions 320 and 322 include items less frequently purchased for infants, such as bottle warmers 322c or cooler bags 322d. In some implementations, the extras regions 320 and 322 serve as suggestions to a user of product sub-categories not yet included in the gift registry presented by the web page 300. For example, after the user has registered for products in one or more product sub-categories, additional product sub-categories are presented to the user in the extras regions 320 and 322, such as layettes 320c and pajamas 320d, to encourage the user to consider additional registry items.

One or more of the product sub-categories listed in the extras regions 320 and 322, in some implementations, include an associated total number of items 323. In some examples, the total number of items 323 refers to a number of promotional items (e.g., on sale, clearance, or special offer) included in the particular product sub-category, a number of new items included in the particular product sub-category, or a number of user-recommended items included in the particular product sub-category (e.g., based upon previous purchase behavior, items currently registered for, previous browsing behavior, etc.). For example, sweaters & hoodies 323a is associated with a total number of items 323a of four, while layettes 323b is associated with a total number of items 323b of nine.

In addition to building a gift registry through the "registry builder" tab 310b, in some implementations, the user selects the "what's new" tab 310a to review new baby products available for purchase or the "my items" tab 310c to review baby products selected for purchase for the particular user. In some examples, products presented upon selection of the "my items" tab 310c include products recommended to the user based upon user history and other user data such as previous purchase behavior, items currently added to the gift registry, or previous browsing behavior. In other implementations, selection of the "my items" tab 310c presents the user with a list of products currently added to the gift registry.

In the top right corner of the registry builder tab 310b, a registered products indicator 324 presents a tally of the total number of items registered within the gift registry while a purchased indicator 326 presents a tally of the total number of items already purchased from the gift registry. The user, for example, reviews the registered products indicator 324 to determine whether he or she has included an adequate number of gifts in the registry. In another example, the user compares the tally presented by the purchased indicator 326 to the tally presented in the registered products indicator 324 to determine whether to register for more gifts (e.g., all or nearly all of the registered gifts have already been purchased).

When the user has completed registering for products, the user selects a preview registry control 328 within the guest registry region 308 to view the registry as presented to a guest shopping for a gift. For example, selection of the preview registry control 328 causes the presentation of an additional web page including a gift registry interface. In other implementations, selection of the preview registry control 328 presents the user with a printable document. The printable document, for example, is provided to a user for shopping for registered gifts in a bricks and mortar store associated with the web page 300.

The user selects a share control 330, presented above the preview registry control 328, to share the registry information with additional users. For example, selection of the share control 330 launches a new web page or a pop-up window providing the user with the ability to provide the registry information with one or more users. The user indicates the other users, in some examples, by providing the email addresses of the other users, selecting the other users from a "friends" list of other users registered with the web site, selecting the other users from a "friends" list provided by a third party social networking system, or providing the phone numbers of the other users to have registry information sent to the other users through text messaging.

The guest registry region 308 also includes a print registry control for printing a copy of the registry information and an edit settings control for modifying gift registry settings. The gift registry settings, in some examples, may include the name of the baby, the due date of the baby, a theme (e.g., colors, wallpaper, images) to apply to the gift registry, or a baby shower party date.

A number of implementations have been described. Nevertheless, it will be understood that various modifications may be made without departing from the spirit and scope. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A computer-implemented method of rendering a web page, the computer-implemented method including the steps of:
    operating one or more computers to serve one or more files to create and display an interactive web page on an electronic display, the interactive web page being configured to process one or more entries from an individual;
    displaying the interactive web page on the electronic display; the interactive web page including:
    a first region including a menu bar and a search input box;
    a second region below the first region having a registry creation control and a registry search box, the registry creation control being configured to receive and process one or more entries from an individual to create a personalized gift registry, the registry search box being configured to receive and process one or more entries from an individual to locate a previously created personalized gift registry; and
    a third region and a fourth region, both positioned below the second region,
    the third region displaying information regarding a first promotional concept, and
    the fourth region including two or more promotional sub-regions each displaying information pertaining to second and third promotion concepts, respectively, wherein
        the fourth region is aligned substantially horizontally parallel to the third region, and
        the two or more promotional sub-regions are aligned vertically in a column, the column being substantially a width of the fourth region;
    receiving one or more entries from an individual interacting with the registry creation control; and,
    creating, with the one or more computers, a personalized gift registry based on the one or more entries received by an individual interacting with the registry creation control.

2. The computer implemented method of claim 1, wherein a width ratio of a first width of the third region to a second width of the fourth region is at least 70:30.

3. The computer implemented method of claim 1, wherein the web page has an aspect ratio of a height of the web page to a width of the web page of at least about 3:1 and includes both a portion of information in the fourth region and a portion of at least one of the promotional sub-regions below a lower boundary of a viewable page area displayed when the display is first displayed on a monitor having an aspect ratio of about 1:1 or less.

4. The computer implemented method of claim 3, wherein the web page has an aspect ratio of at least about 4:1.

5. A computer-implemented method of rendering one or more web pages, the computer-implemented method including the steps of:
    operating one or more computers to serve one or more files to create and display an interactive first web page on an electronic display, the interactive web page being configured to process one or more entries from an individual;
    displaying the interactive web page on the electronic display; the interactive first web page including:
    a first region including a menu bar and a search input box;
    a second region below the first region having a registry creation control and a registry search box, the registry creation control being configured to receive and process one or more entries from an individual to create a personalized gift registry, the registry search box being configured to receive and process one or more entries from an individual to locate a previously created personalized gift registry; and
    a third region and a fourth region, both positioned below the second region,
    the third region displaying information regarding a first promotional concept, and
    the fourth region including two or more promotional sub-regions each displaying information pertaining to second and third promotion concepts, respectively, wherein
        the fourth region is aligned substantially horizontally parallel to the third region, and
        the two or more promotional sub-regions are aligned vertically in a column, the column being substantially a width of the fourth region;
    a first area which when activated by a user will render a second web page, the second web page including:
    a shopping cart indicator;
    a first product description, the first product description including a first product image and a first product price; and
    a first purchase control associated with a first product described by the first product description, the purchase control selectable to cause the addition of the first product to a shopping cart feature associated with the shopping cart indicator, wherein
        selection of one of the shopping cart indicator and the first purchase control causes the generation of a pop-up window, the pop-up window including
            a first region including a shopping cart summary and a checkout control selectable to cause the generation of a purchase order, and
            a second region including one or more product summary descriptions, each product summary description describing a respective product selected by a user for purchase, wherein
                the first region of the pop-up window is horizontally aligned with the second region of the pop-up window,
                the first region of the pop-up window and the second region of the pop-up window are substantially identical in height, and
                a width ratio of the first region of the pop-up window to the second region of the pop-up window is about 40:60;
    receiving one or more entries from an individual interacting with the registry creation control;
    creating, with the one or more computers, a personalized gift registry based on the one or more entries received by an individual interacting with the registry creation control;
    receiving one or more entries from an individual interacting with the registry search box; and,
    locating, with the one or more computers, a previously created personalized gift registry based on the one or more entries received by an individual interacting with the registry search box.

6. The computer implemented method of claim 5, wherein the pop-up window is generated upon selection of the first purchase control, the first region of the pop-up window further including a first product summary description including the first product price and a first preview image substantially identical to the first product image.

7. The computer implemented method of claim 6, wherein the second region of the pop-up window further includes the first product summary description.

8. The computer-implemented method of claim 5, wherein the one or more product summary descriptions are aligned in a tiled format in the second region of the pop-up window, the respective product summary descriptions including a respective product preview image above a respective product price.

9. The computer-implemented method of claim 8, wherein the respective product summary descriptions further include a respective product name and a respective product review.

10. The computer-implemented method of claim 5, wherein the shopping cart summary includes a total number of items, an item cost subtotal and an estimating shipping cost.

11. The computer-implemented method of claim 5, wherein the second region of the pop-up window further includes a message encouraging the user to review the one or more product summary descriptions.

12. The computer-implemented method of claim 5, wherein the first region of the pop-up window further includes a message indicating a total additional cost for free shipping eligibility.

13. A computer-implemented method of rendering one or more web pages, the computer-implemented method including the steps of:
   operating one or more computers to serve one or more files to create and display an interactive first web page on an electronic display, the interactive web page being configured to process one or more entries from an individual,
   displaying the interactive web page on the electronic display; the interactive first web page including:
   a first region including a menu bar and a search input box;
   a second region below the first region having a registry creation control and a registry search box, the registry creation control being configured to receive and process one or more entries from an individual to create a personalized gift registry, the registry search box being configured to receive and process one or more entries from an individual to locate a previously created personalized gift registry; and
   a third region and a fourth region, both positioned below the second region,
   the third region displaying information regarding a first promotional concept, and
   the fourth region including two or more promotional sub-regions each displaying information pertaining to second and third promotion concepts, respectively, wherein the fourth region is aligned substantially horizontally parallel to the third region, and
   the two or more promotional sub-regions are aligned vertically in a column, the column being substantially a width of the fourth region;
   a first area which when activated by a user will render a second web page, the second web page including:
   a first region including a menu bar and a search input box;
   a second region below the first region of the second web page having a share registry control; and
   a third region positioned below the second region of the second web page, the third region of the second web page displaying information regarding a gift registry, the third region of the second web page including one or more product category regions, each product category region including one or more product sub-categories, wherein
      each product sub-category includes a respective circle icon,
      a first product sub-category in a first product category region includes a first respective circle icon, the first respective circle icon including a first numeral indicating a first number of items within the first product sub-category,
      the first product sub-category is selectable to cause the presentation of one or more items categorized within the first product sub-category, the items being available to purchase through a retailer associated with the web page, and
      the share registry control is selectable to cause the presentation of a user interface configured to accept information related to one or more additional users and to cause the sharing of gift registry information with the one or more additional users;
   receiving one or more entries from an individual interacting with the registry creation control;
   creating, with the one or more computers, a personalized gift registry based on the one or more entries received by an individual interacting with the registry creation control; and,
   sharing, using the one or more computers, the personalized gift registry with one or more additional users.

14. The computer-implemented method of claim 13, wherein the first product category region further includes an extras region listing one or more additional product sub-categories.

15. The computer-implemented method of claim 14, wherein a first additional product sub-category includes a numeral indicator presenting a second number of items.

16. The computer-implemented method of claim 13, wherein the third region of the second web page is presented as an active tab, and wherein selection of an inactive tab causes the replacement of information in the third region of the second web page, including the one or more product category regions, with information relevant to the previously inactive tab.

17. The computer-implemented method of claim 13, wherein the third region of the second web page further includes a registered items indicator and a purchased items indicator.

18. The computer-implemented method of claim 13, wherein the first numeral included with the first respective circle icon indicates a number of recommended items.

19. The computer-implemented method of claim 13, wherein the first numeral included with the first respective circle icon indicates a number of registered items.

* * * * *